United States Patent
Sim et al.

(10) Patent No.: US 9,417,628 B2
(45) Date of Patent: Aug. 16, 2016

(54) PRODUCTION FAILURE ANALYSIS SYSTEM

(71) Applicant: Western Digital Technologies, Inc., Irvine, CA (US)

(72) Inventors: Kiam Hwee Sim, Singapore (SG); Nattaphat Kojarunchitt, Prathumtanee (TH); Apisit Boonseng, Prathumtanee (TH); Meng Seng Ng, Shah Alam (MY)

(73) Assignee: Western Digital Technologies, Inc., Irvine, CA (US)

( * ) Notice: Subject to any disclaimer, the term of this patent is extended or adjusted under 35 U.S.C. 154(b) by 668 days.

(21) Appl. No.: 13/802,557

(22) Filed: Mar. 13, 2013

(65) Prior Publication Data

US 2014/0277673 A1 Sep. 18, 2014

(51) Int. Cl.
*G05B 23/02* (2006.01)

(52) U.S. Cl.
CPC ........ *G05B 23/0281* (2013.01); *G05B 23/0275* (2013.01)

(58) Field of Classification Search
None
See application file for complete search history.

(56) References Cited

U.S. PATENT DOCUMENTS

| | | | |
|---|---|---|---|
| 4,126,933 A * | 11/1978 | Anderson | H02K 1/28 29/598 |
| 4,537,509 A * | 8/1985 | Kronfeld | G01B 11/27 33/276 |
| 4,979,055 A * | 12/1990 | Squires | G06F 11/22 360/69 |
| 5,152,182 A * | 10/1992 | Searle | G01L 5/0042 73/862.21 |
| 5,576,967 A * | 11/1996 | Grabner | B21B 37/00 700/122 |
| 5,619,644 A * | 4/1997 | Crockett | G06F 11/0727 714/13 |
| 6,018,789 A | 1/2000 | Sokolov et al. | |
| 6,021,666 A * | 2/2000 | Yao | G11B 5/82 73/105 |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |

(Continued)

OTHER PUBLICATIONS

Philippe Magnier, "Statistical Process Control Implementation Roadmap," Lean Flow Consulting, Appendix MSP10A-Release 1.10 US, 2005-2008, pp. 1-6.

*Primary Examiner* — Mohammad Ali
*Assistant Examiner* — Kelvin Booker

(57) ABSTRACT

A production failure analysis system including a factory quality control unit configured to transmit a trigger signal when a production failure is detected, and an analytics unit. The analytics unit is configured to determine a root cause of the production failure by at least receiving the trigger signal from a factory quality control unit, extracting production data from a database when the trigger signal is received, wherein the production data includes process input variables, and identifying one or more potential root causes of the production failure based in part on an analysis of the process input variables.

30 Claims, 10 Drawing Sheets

(56) References Cited

U.S. PATENT DOCUMENTS

| | | |
|---|---|---|
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,304,839 B1 * | 10/2001 | Ho .................. G01R 31/31721 703/18 |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,906,880 B1 * | 6/2005 | Codilian ................. G11B 5/012 360/66 |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |

(56) References Cited

U.S. PATENT DOCUMENTS

| | | |
|---|---|---|
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,130,709 B2 * | 10/2006 | Popp ............... A61F 13/15772 700/108 |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,971,093 B1 * | 6/2011 | Goel ............... G06F 11/004 714/6.22 |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |

(56) References Cited

U.S. PATENT DOCUMENTS

| | | |
|---|---|---|
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2002/0137827 A1* | 9/2002 | Tomioka ............... C08G 64/06 524/317 |
| 2003/0204347 A1* | 10/2003 | Smith .................... G11B 7/268 702/82 |
| 2004/0073327 A1* | 4/2004 | Shimada ............ G05B 19/4184 700/108 |
| 2004/0158426 A1* | 8/2004 | Gershenzon ........... G01B 7/105 702/149 |
| 2004/0186927 A1* | 9/2004 | Eryurek ................. G05B 15/02 710/12 |
| 2005/0021293 A1* | 1/2005 | Elbel ................. G05B 23/0254 702/183 |
| 2005/0226110 A1* | 10/2005 | Suzuki ............... G11B 5/59633 369/44.29 |
| 2007/0180337 A1* | 8/2007 | Courtney ............. G06F 11/008 714/54 |
| 2008/0147226 A1* | 6/2008 | Matsushita ...... G05B 19/41875 700/110 |
| 2009/0113702 A1 | 5/2009 | Hogg |
| 2010/0191361 A1* | 7/2010 | McCready ........... G05B 13/048 700/104 |
| 2010/0198556 A1* | 8/2010 | Kost ..................... G05B 23/024 702/183 |
| 2010/0306551 A1 | 12/2010 | Meyer et al. |
| 2011/0141266 A1* | 6/2011 | Fontanot ........... G05B 19/4183 348/86 |

(56) References Cited

U.S. PATENT DOCUMENTS

| | | | |
|---|---|---|---|
| 2011/0196526 A1* | 8/2011 | Barton | G05B 19/41875 700/103 |
| 2011/0208013 A1* | 8/2011 | Phan | A61B 5/002 600/301 |
| 2011/0226729 A1 | 9/2011 | Hogg | |
| 2012/0078410 A1* | 3/2012 | Wong | G06Q 10/06395 700/110 |
| 2012/0159042 A1 | 6/2012 | Lott et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |
| 2013/0091698 A1* | 4/2013 | Banshak, Jr. | G11B 5/48 29/729 |
| 2013/0094110 A1* | 4/2013 | Seymour | G11B 5/4813 360/294.6 |
| 2013/0124932 A1* | 5/2013 | Schuh | G11C 29/08 714/718 |
| 2014/0059278 A1* | 2/2014 | Schuh | G06F 12/0246 711/103 |
| 2014/0192583 A1* | 7/2014 | Rajan | G11C 7/10 365/63 |

\* cited by examiner

| PIV1 | PIV2 | | | PIV3 |
|------|------|------|------|------|
| A1 | B1 | B2 | B3 | C1 ...... CN |

FIG. 2

Leaf Report

Response Probability

| Leaf Label | Fail | Pass | |
|---|---|---|---|
| PIV(4,5,6,7,8,9) & PIV(11,12) | 0.0000 | 1.0000 |  |
| PIV(4,5,6,7,8,9) & PIV(13) | 0.1088 | 0.8912 | |
| PIV(10) & PIV(14,15,16) | 0.7671 | 0.2329 | |
| PIV(10) & PIV(17,18,19,20) | 0.9937 | 0.0063 | |

Response Counts

| Leaf Label | Fail | Pass | |
|---|---|---|---|
| PIV(4,5,6,7,8,9) & PIV(11,12) | 0.000 | 6743.000 |  |
| PIV(4,5,6,7,8,9) & PIV(13) | 629.952 | 5160.048 | |
| PIV(10) & PIV(14,15,16) | 163.3923 | 49.6077 | |
| PIV(10) & PIV(17,18,19 20) | 288.173 | 1.827 | |

| PIV | # of Splits | $G^2$ |
|---|---|---|
| PIV34 | 2 | 2187.1973 |
| PIV35 | 1 | 1011.9809 |
| PIV36 | 1 | 82.6210 |
| PIV37 | 1 | 77.3589 |

FIG. 8

PRODUCTION FAILURE ANALYSIS SYSTEM

BACKGROUND

During a production of a device at a factory, production failures often occur. For example, yields of the device or components of the device may drop below an acceptable level. In such a case, an attempt is made to ascertain a root cause of the production failure. To do so, data is collected from the factory where the production failure occurred. However, when the manufacture of the device involves many steps or machinery, many different categories of data may be collected, with each of the categories possibly having sub-categories of data. This can lead to many different possible combinations being a potential root cause of the production failure.

During a conventional analysis of the production data, the production data is placed in a spreadsheet so that the user can manually analyze the production data to determine if there is a root cause of the production failure. However, such methods are generally cumbersome and inaccurate due to the sheer amount of production data. In some cases, the determination of the root cause of the production failure could take weeks. In the meantime, without appropriate correction of the root cause of the production failure, the production failure may continue to occur.

BRIEF DESCRIPTION OF THE DRAWINGS

The features and advantages of the present embodiments will become more apparent from the detailed description set forth below when taken in conjunction with the drawings, wherein:

FIG. 2 depicts process input variables according to an embodiment;

FIG. 8 depicts a correlation table according to an embodiment;

DETAILED DESCRIPTION

Figure 1:
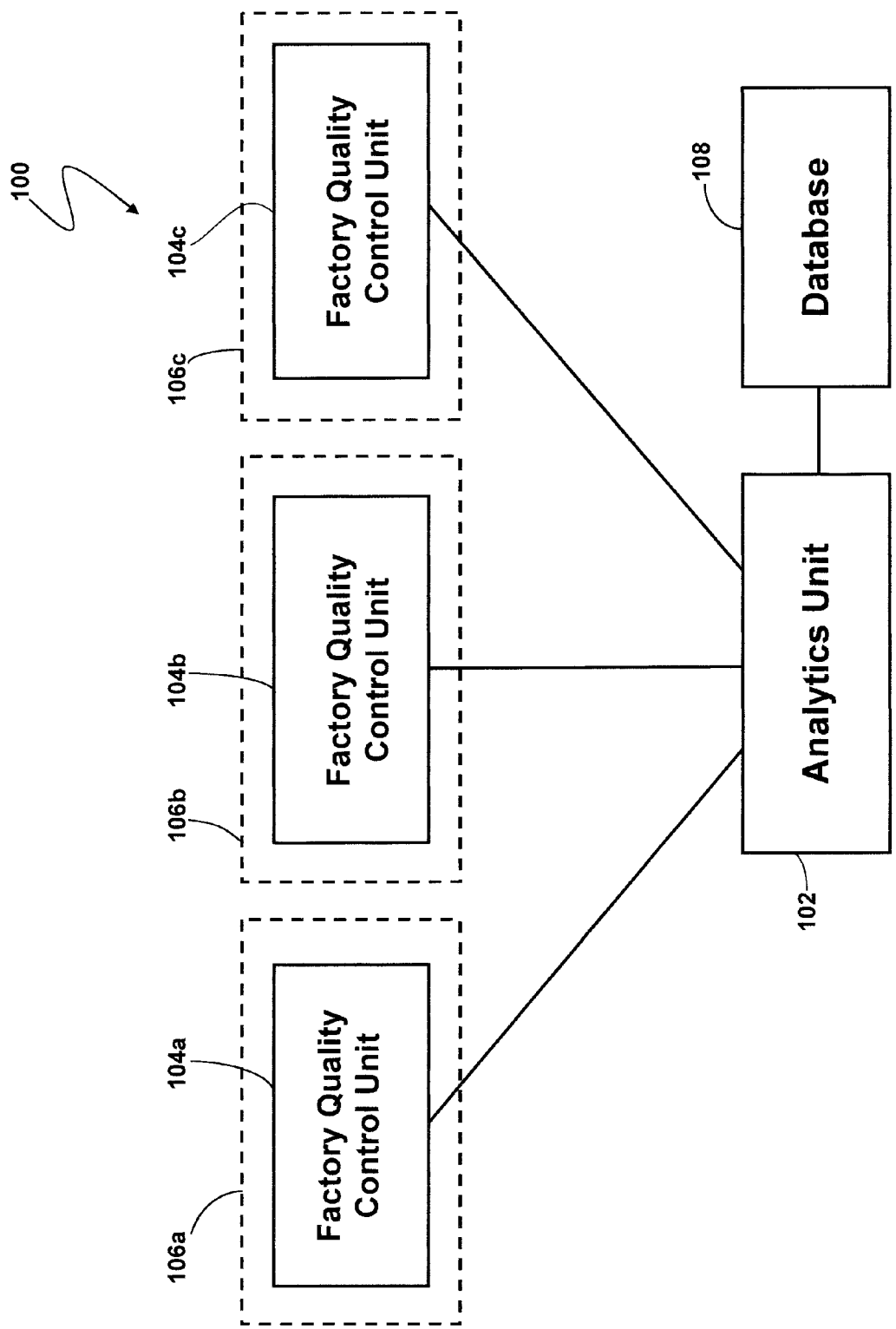
FIG. 1 depicts storage device production failure analysis system according to an embodiment.

In an embodiment shown in FIG. 1, a production failure analysis system 100 comprises an analytics unit 102, factory quality control units 104a-104c, factories 106a-106b, and a database 108. In an embodiment, the production failure analysis system 100 comprises a storage device production failure analysis system 100. In the description below, the production failure analysis system 100 will be described as a storage device production failure analysis system as an exemplary embodiment.

In an embodiment, the factory quality control unit 104a is located in the factory 106a, the factory quality control unit 104b is located in the factory 106b, and the factory quality control unit 104c is located in the factory 106c. Although there are three factory quality control units and three factories shown in the embodiment in FIG. 1, any number of factory quality control units and factories may be utilized. Furthermore, the number of factory quality control units need not be the same as the number of factories. For example, two factory quality control units may reside in a single factory. Similarly, a single factory quality control unit may cover two factories.

The factories 106a-106c can be, for example, factories which produce storage devices. In an embodiment, the factories 106a-106c comprise stations which produce components of the storage devices. In an embodiment, the storage devices are disk drives comprising a magnetic rotating disk. In an embodiment, the storage devices are solid state drives comprising a solid state memory. In an embodiment, the storage devices are other electronic devices such as computers, laptops, media streaming devices, tablets, set-top boxes, watches, servers, routers, or cameras.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Figure 2:
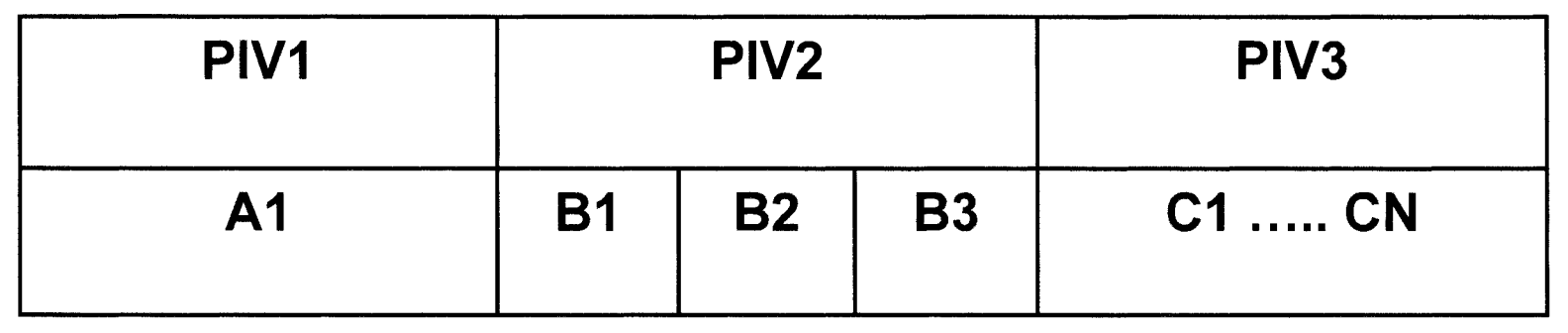

In an embodiment, the factory quality control units 104a-104c generate storage device production data. In an embodiment, the production data comprises process input variables ("PIV"). Each of the process input variables comprises one or more configuration data. For example, in an embodiment shown in FIG. 2, PIV1, PIV2, and PIV3 are shown. PIV1 comprises, for example, a single configuration data A1. PIV2 comprises, for example, three configuration data B1-B3. PIV3, however, comprises a number of configuration data C1-CN where N can be a maximum number of configuration data used.

In an embodiment, the process input variables can be, for example, a category of configuration data. For example, the process input variable can be a media, and the configuration data can be, for example, types of the media. In addition to the media, in an embodiment, the process input variables can also comprise data regarding additional components of the disk drive such as the head stack assembly, suspension, motor, or actuator. Furthermore, in an embodiment, the process input variables can also comprise data regarding the process used to manufacture the disk drive such as the drive assembly line, the media sputter line, tools used for the manufacture of the disk drive, or equipment used for the manufacture of the disk drive.

In an embodiment, the storage device production data also comprises a cumulative yield of the storage devices and a station yield of the storage devices. The cumulative yield can indicate, for example, the yield of the storage devices for a particular factory. The station yield can indicate, for example, the yield of the storage devices or the components of the storage devices for a particular station.

Referring back to FIG. 1, in an embodiment, the factory quality control units 104a-104c transmit the storage production data to the analytics unit 102. The analytics unit 102 stores the storage production data in the database 108. In an embodiment, the analytics unit 102 utilizes the storage device production data to determine a root cause of the storage device production failure, which will be described in more detail below.

In an embodiment, the database 108 is accessible by the analytics unit 102. In an embodiment, the database 108 is located remotely from the analytics unit 102. However, in an embodiment, the analytics unit 102 comprises the database 108.

Figure 3:
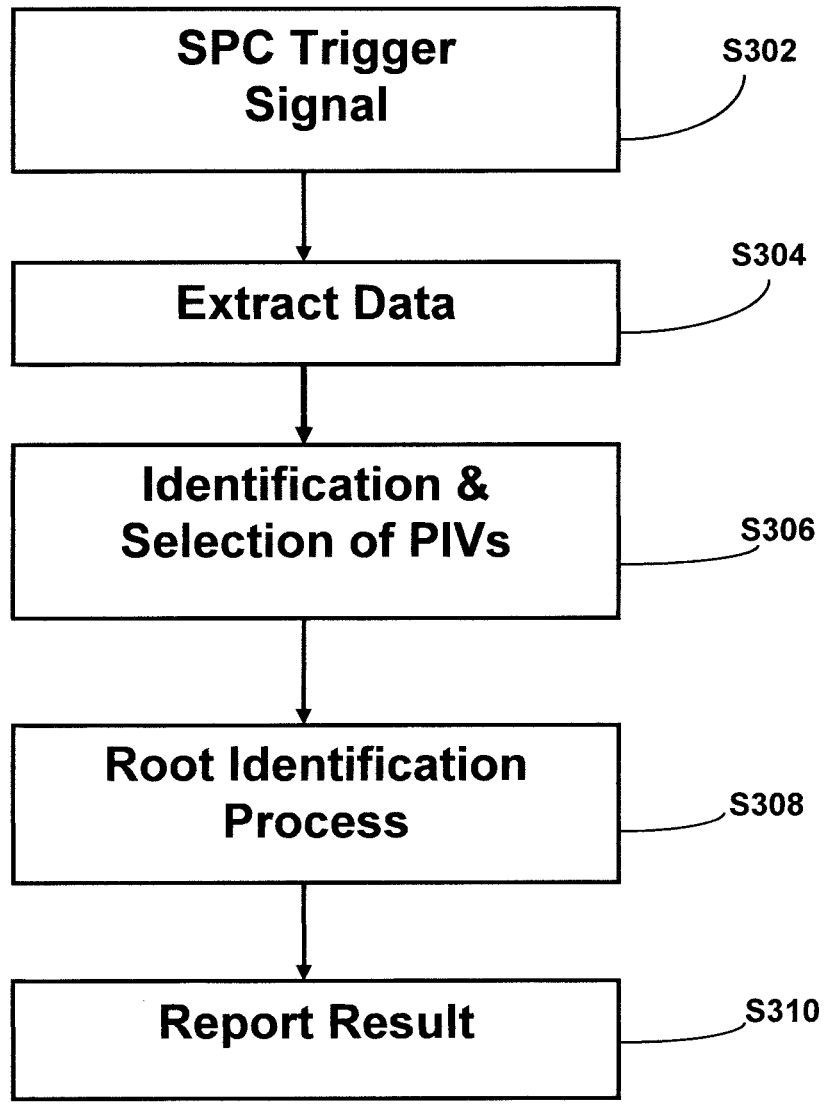
FIG. 3 depicts a process according to an embodiment.

In an embodiment, a process for determining a root cause of a storage device production failure is disclosed in FIG. 3. In block S302, one or more of the factory quality control units 104a-104c transmits a trigger signal to the analytics unit 102 when a storage device production data failure has been detected.

In an embodiment, the factory quality control units 104a-104c analyze the cumulative yield in the disk drives from the storage device production data and determine that the storage device production failure has occurred based on the analysis of the cumulative yield. For example, the factory quality control units 104a-104c can determine that the storage device production failure has occurred when the cumulative yield drops below a predetermined cumulative yield threshold.

In an embodiment, the factory quality control units 104a-104c analyze the station yield in the disk drives from the storage device production data and determine that the storage device production failure has occurred based on the analysis of the station yield. For example, the factory quality control units 104a-104c can determine that the storage device production failure has occurred when the station yield drops below a predetermined station yield threshold.

In block S304, the analytics unit 102 extracts storage device production data from the database 108 when the analytics unit 102 receives the triggers signal. In an embodiment, the analytics unit 102 extracts the storage device production data that corresponds to a factory quality control unit that transmitted the trigger signal.

In block S306, the analytics unit 102 identifies and selects the process input variables for analysis by cleaning the storage device production data. In an embodiment, the analytics unit 102 cleans the storage device production data by separating the process input variables for analysis based on an amount of configuration data. In an embodiment, the process input variables which include more than a single configuration data may be selected for analysis. In an embodiment, the process input variables which include a number of process input variables no greater than the predetermined maximum amount of configuration data may be selected for analysis. For example, if the maximum amount of configuration data was set to thirty configuration data, then process input variables which include between two configuration data and thirty configuration data would be selected for analysis. In an embodiment, the selection of the process input variables based on an amount of configuration data can reduce a likelihood that the identified root cause of the storage device production failure may be too generalized or not specific enough.

In an embodiment, the process input variables which include only a single configuration data are not selected for analysis and instead may be analyzed after the selected process input variables has been analyzed, or even eliminated from analysis. In an embodiment, the process input variables which include a number of process input variables greater than a predetermined maximum amount of configuration data, are not selected for analysis and instead may be analyzed after the selected process input variables has been analyzed, or even eliminated from analysis. For example, if the maximum amount of configuration data was set to thirty configuration data, then process input variables which include a single configuration data or greater than thirty configuration data would not be selected for analysis and would instead be analyzed after the selected process input variables, or be eliminated from analysis.

In block S308, the analytics unit 102 performs a root identification process to identify a root cause of the storage device production failure. In an embodiment, the analytics unit 102 analyzes the selected process input variables to determine the process input variables which correspond to the root cause of the storage device production failure. In an embodiment, the process input variables which correspond to the root cause of the storage device production failure is identified as a root cause of the storage device production failure. In an embodiment, the analysis can utilize a decision tree.

In an embodiment, the analytics unit 102 determines correlation data indicating a correlation of the process input variables which correspond to the root cause of the storage device production failure, and the root cause of the storage device production failure. In an embodiment, the correlation data comprises at least one of logworth data or $G^2$ data.

In an embodiment, the analytics unit 102 determines probabilities that the process input variables are the root cause of the storage device production failure. The analytics unit 102 identifies, for example, the process input variables which are potential root causes of the storage device production failure based in part on the determined probabilities.

In an embodiment the analytics unit 102 determines sum squared errors that the process input variables are the root causes of the storage device production failure. The analytics unit 102 identifies, for example, the process input variables which are potential root causes of the storage device production failure based in part on the sum squared errors.

In an embodiment, the analytics unit 102 may use additional methods to determine the process input variables which are the root cause of the storage device production failure or are most likely the root cause of the storage device production failure.

Figure 4:
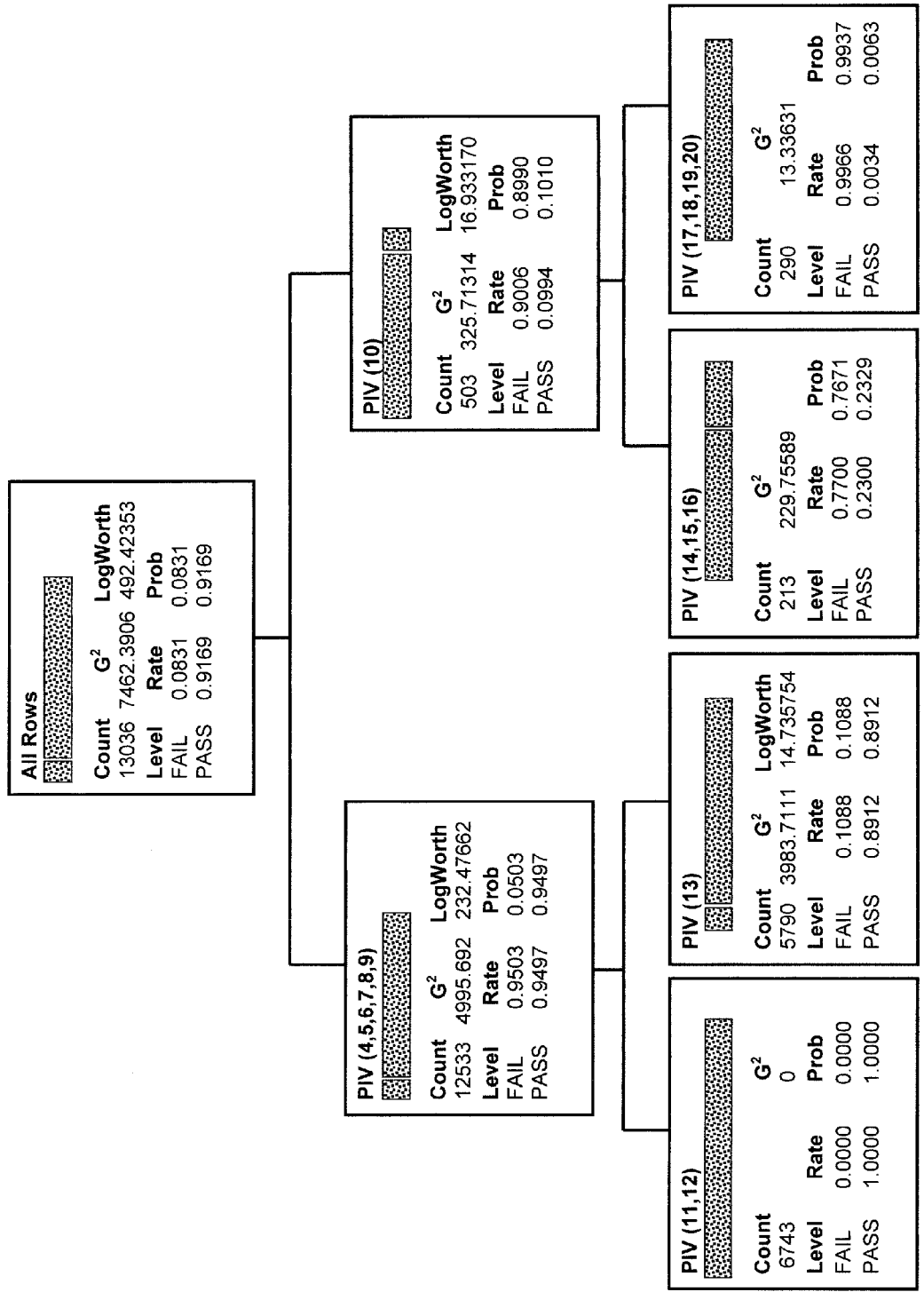
FIG. 4 depicts decision tree graph according to an embodiment.

In block S310, the analytics unit 102 generates a report of the results. In an embodiment the generated report can allow a user to identify or verify the potential root cause of the storage device production failure. For example, the generated report can allow a user to visually identify process input variables which are likely to be the root cause of the storage device production failure and process input variables which are unlikely to be the root cause of the storage device production failure. In an embodiment as shown in FIG. 4, the report comprises a decision tree graph. In a summary node labeled "All Rows", data for some or all process input variables which may be a potential root cause of the storage device production failure are displayed.

Furthermore, in the embodiment shown in FIG. 4, one or more of the process input variables 4-20 are shown as possible candidates of being the root cause of the storage device production failure. In the embodiment shown in FIG. 4, one or more process input variables form a node for a determination of the process input variables which may be a candidate as a likely root cause of the storage device production failure. The nodes are graphically represented as descending from the summary node.

For example, the node for PIV (4, 5, 6, 7, 8, 9) indicates that the process input variables 4-9 as a group may be a root cause of the storage device production failure. Similarly, the node for PIV (10) indicates that the process input variable 10 may be a potential root cause of the storage device production failure. In an embodiment, the node for PIV (4, 5, 6, 7, 8, 9) is a parent node for the nodes for PIV (11, 12) and PIV (13). In an embodiment, the nodes for PIV (11, 12) and PIV (13) are child nodes of the node for PIV (4, 5, 6, 7, 8, 9). In an embodiment, the node for PIV (10) is a parent node for the nodes for PIV (14, 15, 16) and the node for PIV (17, 18, 19, 20). In an embodiment, the nodes for PIV (14, 15, 16) and PIV (17, 18, 19, 20) are child nodes of the node for PIV (10).

In an embodiment, the nodes indicate data corresponding to the likelihood that the process input variables in the specific node and its parent node are a root cause of the storage production failure. For example, the node for PIV (11, 12) can indicate data corresponding to the likelihood that the process input variables 4-9 in addition to the process input variables 11 and 12 are the root cause of the storage device production failure since the node for PIV (4, 5, 6, 7, 8, 9) is a parent node for the node for PIV (11, 12). In an embodiment, the summary node is not considered a parent node for the node for PIV (4, 5, 6, 7, 8, 9) or the node for PIV (10) and instead graphically represent a summary of the data for some or all process input variables which may be a potential root cause of the storage device production failure.

As can be seen in the embodiment shown in FIG. 4, correlation data such as logworth data or $G^2$ data are shown for some of the nodes. In an embodiment, not all of the nodes contain correlation data. In an embodiment, the correlation data can comprise other types of correlation data which may be useful in determining a potential root cause of the production failure.

In an embodiment shown in FIG. 4, fail probabilities and pass probabilities are shown in the nodes for the corresponding process input variables. Furthermore, in an embodiment, a rate of the fail probabilities and the pass probabilities are shown.

Figure 5:
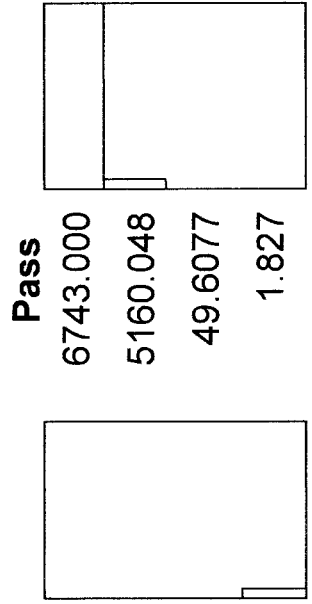
FIG. 5 depicts a leaf report according to an embodiment.
Figure 5:
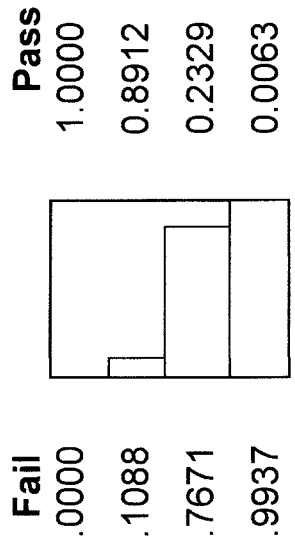

In an embodiment shown in FIG. 5, the report comprises a leaf report. The leaf report can comprise, for example, response probabilities for one or more of the nodes containing process input variables which may be a potential root cause of the storage device production failure. The leaf report can also comprise, for example, response counts for one or more of the nodes containing process input variables which may be the root cause of the storage device production failure.

Figure 6:
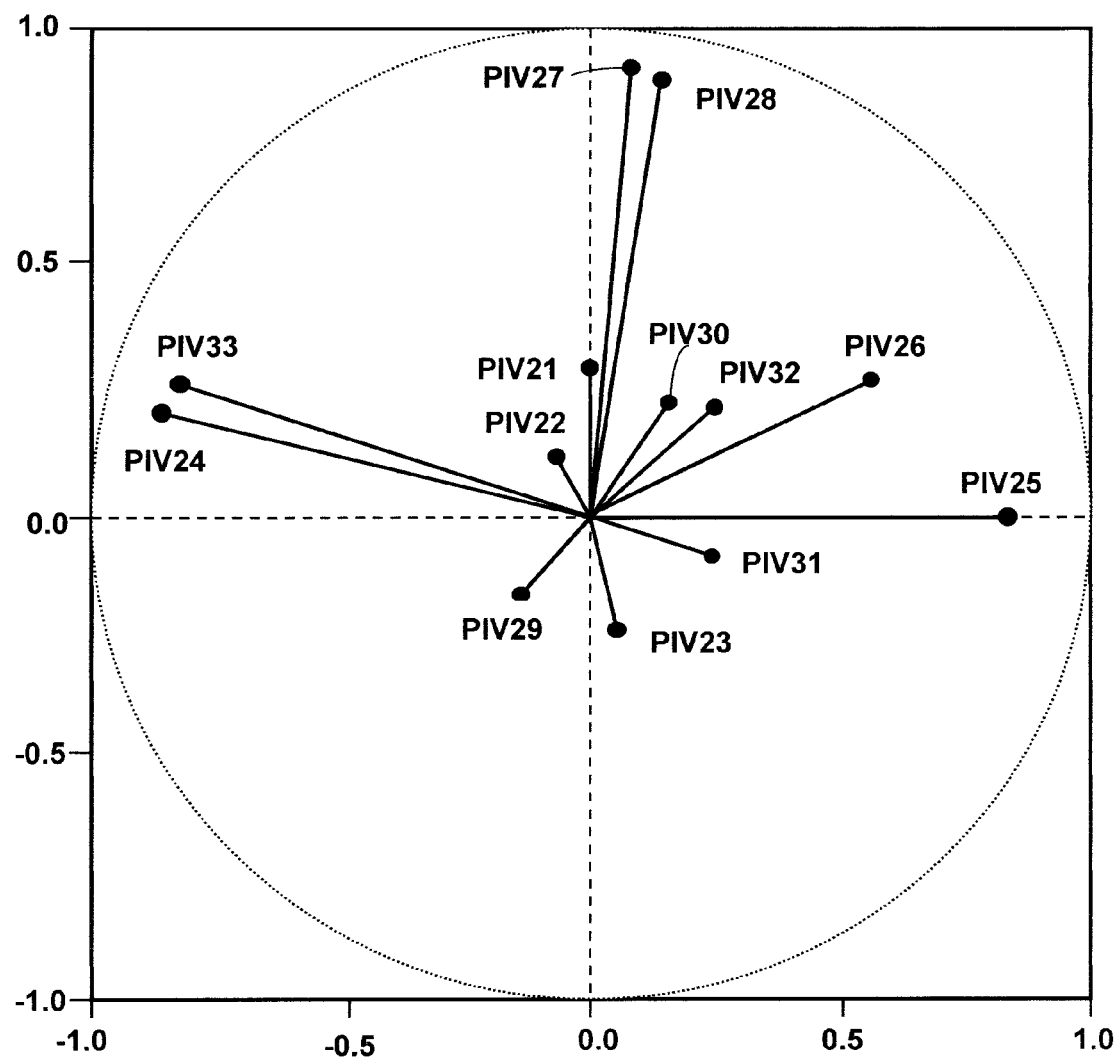
FIG. 6 depicts a correlation chart according to an embodiment.
Figure 7:
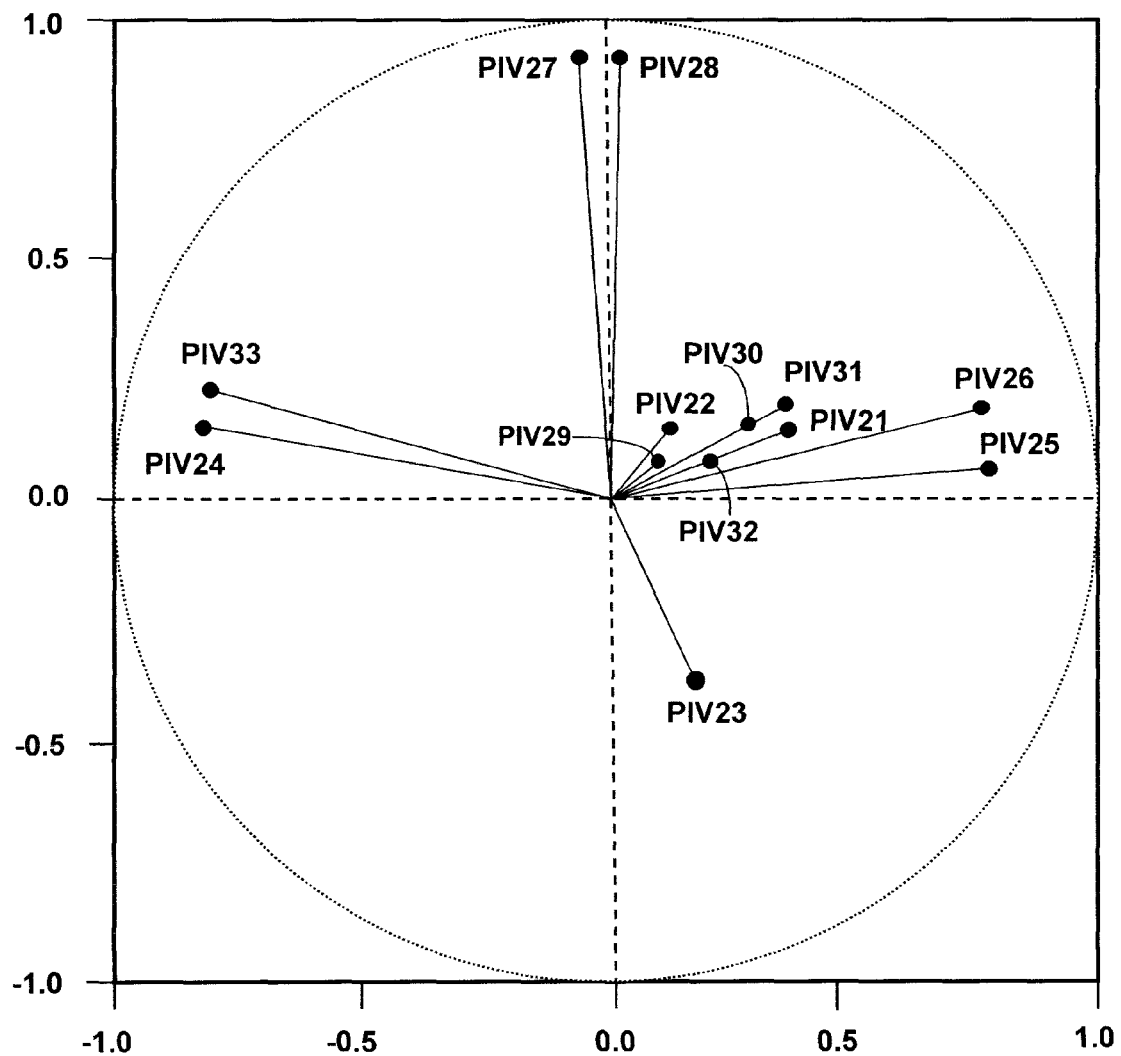
FIG. 7 depicts a correlation chart according to an embodiment.

In embodiments shown in FIGS. 6-8, the report comprises one or more correlation data charts. In the embodiments shown in FIGS. 6 and 7, correlation data graphs for a principal component analysis is shown. The principal component analysis can, for example, compress multi-dimension information into a two-dimensional space. The embodiment shown in FIG. 6 can be, for example, the correlation output of FAIL, while the embodiment shown in FIG. 7 can be, for example, the correlation output of PASS. In the embodiments shown in FIGS. 6 and 7, PIV 31 is more negatively correlated to PIVs 33 and 24 for the FAIL than the PASS. In an embodiment shown in FIG. 8, a correlation data table is shown with a number of splits and $G^2$ data for one or more of the process input variables.

In an embodiment, one or more of the factories 106a-106c may be adjusted based on the identification of the process input variables which are a potential root cause of the storage device production failure. For example, tools or equipment within the station may be temporarily shut down for refurbishment based on the process input variables which are a potential root cause of the storage device production failure.

In an embodiment, although certain data, charts, graphs, and tables are disclosed in FIGS. 4-8, the generated report can comprise additional data, charts, graphs, and tables which may be useful for the user to identify or verify the root cause of the storage device production failure or the potential root cause of the storage device production failure. Furthermore, in an embodiment, some portions or all of the generated report may be displayed on a web page or transmitted to one or more appropriate users. In an embodiment, the generated report may be generated automatically by the analytics unit 102 based on the trigger signal transmitted by one or more of the factory quality control units 104a-104c.

Figure 9:
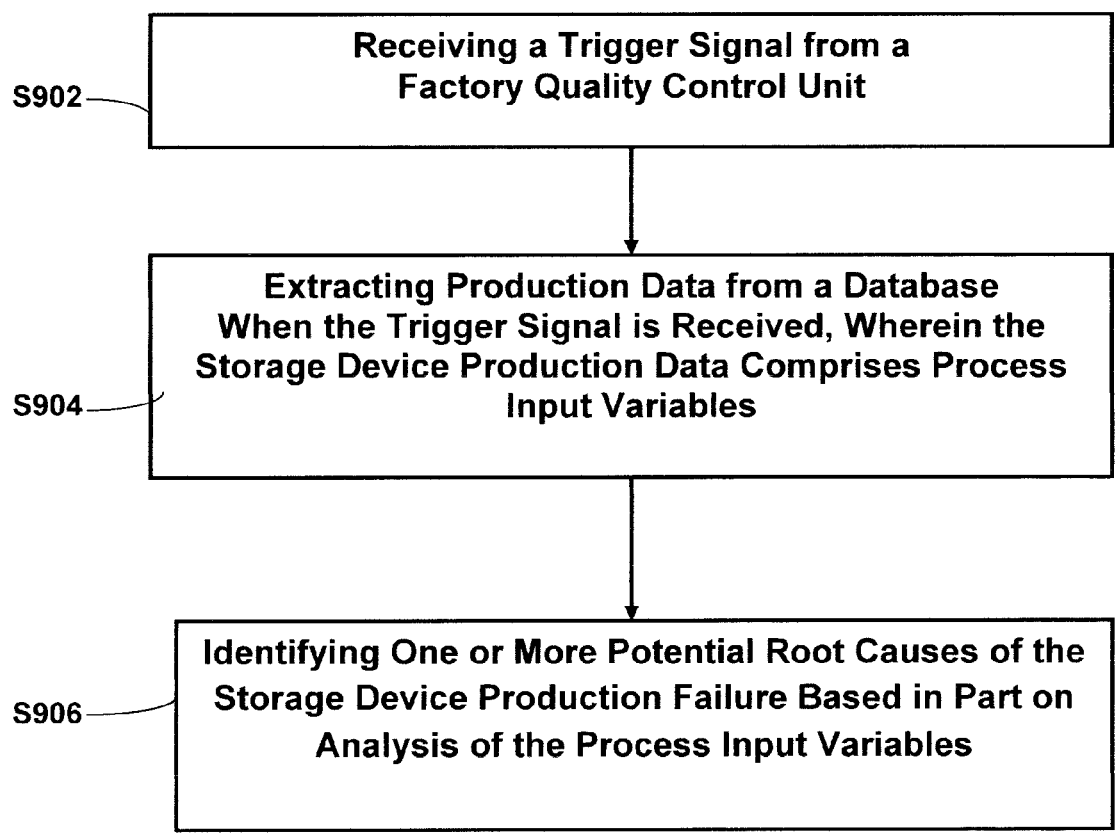
FIG. 9 depicts a process according to an embodiment.

In an embodiment, a process for determining a root cause of a storage device production failure for a storage device production failure analysis system is shown in FIG. 9. In block S902, the analytics unit 102 receives a trigger signal from a factory quality control unit, such as one of the factory quality control units 104a-104c. In block S904, the analytics unit 102 extracts production data from the database 108 when the trigger signal is received. The storage device production data can comprise, for example, process input variables. In block S906, the analytics unit identifies one or more potential root causes of the storage device production failure based in part on an analysis of the process input variables.

As previously noted, the production failure analysis system 100 need not be limited to storage device production failure analysis system. In an embodiment the production failure analysis system can be utilized for the production of other devices aside from disk drives. For example, the factories 106a-106c can produce the devices, while the factory quality control units 104a-104c can generate production data for the devices.

In an embodiment, the factory quality control units 104a-104c analyze the cumulative yield in the devices from the production data and determine when the production failure has occurred based on the analysis of the cumulative yield. For example, the factory quality control units 104a-104c can determine when the storage device production failure has occurred when the cumulative yield drops below a predetermined cumulative yield threshold.

In an embodiment, the factory quality control units 104a-104c analyzes the station yield in the device from the production data and determines that the storage device production failure has occurred based on the analysis of the station yield. For example, the factory quality control units 104a-104c can determine that the production failure has occurred when the station yield drops below a predetermined station yield threshold.

Figure 10:
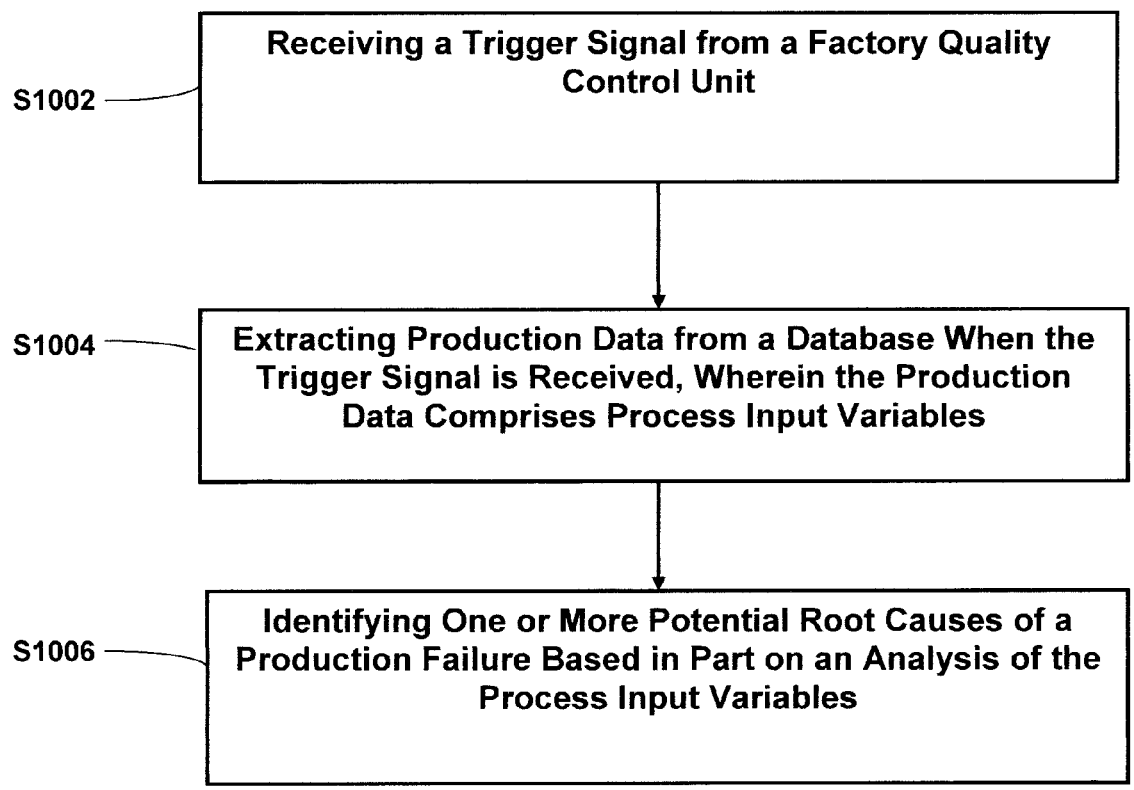
FIG. 10 depicts a process according to an embodiment.

In an embodiment, a process determining a root cause of a production failure for a production failure analysis system is shown in FIG. 10. In an embodiment, the process disclosed in FIG. 10 is similar to the process disclosed above, but which can be applicable to other devices instead of the disk drive. In such a case, the steps disclosed above can be adapted for other devices instead of the disk drive.

In block S1002, the analytics unit 102 receives a trigger signal from a factory quality control unit such as the factory quality control units 104a-104c. In block S1004 the analytics unit 102 extracts production data from the database 108. In an embodiment, the production data comprises process input variables. In block S1006, the analytics unit 102 identifies one or more potential root causes of a production failure based in part on an analysis of the process input variables.

In an embodiment, the factory quality control units 104a-104c and the analytics unit 102 may be used to determine one or more potential root causes of production success. For example, when the station yield or the cumulative yield are acceptable levels, the analytics unit 102 may determine process input variables which contribute to the success. In an embodiment, the process input variables which are potential root causes of production success may be used to lock in favorable conditions to repeat the success.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A storage device production failure analysis system comprising:
   a factory quality control unit configured to transmit a trigger signal when a storage device production failure is detected; and
   an analytics unit configured to determine a root cause of the storage device production failure by at least:
   receiving the trigger signal from a factory quality control unit;
   extracting storage device production data from a database when the trigger signal is received, wherein the storage device production data comprises process input variables;
   identifying one or more potential root causes of the storage device production failure based in part on an analysis of the process input variables; and
   generating a report indicating the process input variables that correspond to the root cause of the storage device production failure, the report comprising at least one of a decision tree graph, a leaf report and a correlation data chart.

2. The system of claim 1 wherein the factory quality control unit is configured to generate the storage device production data.

3. The system of claim 2 wherein the storage device production data comprises a cumulative yield, and the factory quality control unit detects the storage device production failure based on the cumulative yield.

4. The system of claim 2 wherein the storage device production data comprises a station yield, and the factory quality control unit detects the storage device production failure based on the station yield.

5. The system of claim 1 wherein the analytics unit is further configured to determine a root cause of the storage device production failure by at least:
   cleaning the storage device production data.

6. The system of claim 5 wherein the process input variables comprise one or more configuration data.

7. The system of claim 6 wherein the cleaning the storage device production data further comprises:
   separating the process input variables for analysis based on an amount of the configuration data.

8. The system of claim 1 wherein the identifying one or more potential root causes of the storage device production failure based in part on an analysis of the process input variables further comprises:
   determining, using sum squared errors, that the process input variables are the root causes of the storage device production failure; and
   identifying the process input variables which are potential root causes of the storage device production failure based in part on the sum squared errors.

9. The system of claim 1, wherein the report comprises correlation data indicating a correlation of the process input variables which correspond to the root cause of the storage device production failure and the root cause of the storage device production failure.

10. The system of claim 9 wherein the correlation data comprises logworth data.

11. The system of claim 9 wherein the correlation data comprises G2 data.

12. The system of claim 1, wherein the report comprises storage device fail data and storage device pass data for the process input variables which correspond to the root cause of the storage device production failure.

13. The system of claim 1 wherein the identifying one or more potential root causes of the storage device production failure based in part on an analysis of the process input variables further comprises:
   determining probabilities that the process input variables are the root causes of the storage device production failure; and
   identifying the process input variables which are potential root causes of the storage device production failure based in part on the determined probabilities.

14. A production failure analysis system comprising:
   a factory quality control unit configured to transmit a trigger signal when a production failure is detected; and
   an analytics unit configured to determine a root cause of the production failure by at least:
   receiving the trigger signal from a factory quality control unit;
   extracting production data from a database when the trigger signal is received, wherein the production data comprises process input variables; and
   identifying one or more potential root causes of the production failure based in part on an analysis of the process input variables by:

determining, using sum squared errors, that the process input variables are the root causes of the production failure; and identifying the process input variables which are potential root causes of the production failure based in part on the sum squared errors.

15. The system of claim 14 wherein the analytics unit is further configured to determine a root cause of the production failure by at least:

generating a report indicating the process input variables which correspond to the root cause of the production failure.

16. The system of claim 14 wherein the identifying one or more potential root causes of the production failure based in part on an analysis of the process input variables further comprises:

determining probabilities that the process input variables are the root causes of the production failure; and identifying the process input variables which are potential root causes of the production failure based in part on the determined probabilities.

17. A storage device production failure analysis system comprising:

a factory quality control unit configured to transmit a trigger signal when a storage device production failure is detected; and an analytics unit configured to determine a root cause of the storage device production failure by at least:

receiving, the trigger signal from a factory quality control unit;

extracting storage device production data from a database when the trigger signal is received, wherein the storage device production data comprises process input variables; and identifying one or more potential root causes of the storage device production failure based in part on an analysis of the process input variables by:

determining, using sum squared errors, that the process input variables are the root causes of the storage device production failure; and identifying the process input variables that are potential root causes of the storage device production failure based in part on the sum squared errors.

18. A method for determining a root cause of a storage device production failure for a storage device production failure analysis system, the method comprising at least:

receiving a trigger signal from a factor quality control unit, the trigger signal generated when a storage device production failure is detected;

extracting storage device production data from a database when the trigger signal is received, wherein the storage device production data comprises process input variables; and identifying, one or more potential root causes of the storage device production failure based in part on an analysis of the process input variables by:

determining, using sum squared errors, that the process input variables are the root causes of the storage device production failure; and identifying the process input variables which are potential root causes of the storage device production failure based in art on the sum squared errors.

19. The method of claim 18 wherein the factory quality control unit, is configured to generate a storage device production data.

20. The method of claim 19 wherein the storage device production data comprises a cumulative yield, and the factory quality control unit detects the storage device production failure based on the cumulative yield.

21. The method of claim 19 wherein the storage device production data comprises a station yield, and the factory quality control unit detects the storage device production failure based on the station yield.

22. The method of claim 18 further comprising;

cleaning the storage device production data.

23. The method of claim 22 wherein the process input variables comprise one or more configuration data, and wherein the cleaning the storage device production data further comprises:

separating the process input variables for analysis based on an amount of the configuration data.

24. The method of claim 18 further comprising generating a report indicating the process input variables which correspond to the root cause of the storage device production failure.

25. The method of claim 24 wherein the report comprises correlation data indicating a correlation of the process input variables which correspond to the root cause of the storage device production failure, and the root cause of the storage device production failure.

26. The method of claim 24 wherein the report comprises storage device fail data and storage device pass data for the process input variables which correspond to the root cause of the storage device production failure.

27. The method of claim 18 wherein the identifying one or more potential root causes of the storage device production failure based in part on an analysis of the process input variables further comprises:

determining probabilities that the process input variables are the root causes of the storage device production failure; and identifying the process input variables which are potential root causes of the storage device production failure based in part on the determined probabilities.

28. A non-transitory machine readable medium comprising instructions which, when executed, direct a computing system to perform operations comprising:

receiving a trigger signal from a factory quality control unit, the trigger signal generated when a storage device production failure is detected;

extracting storage device production data from a database when the trigger signal is received, wherein the storage device production data comprises process input variables; and identifying one or more potential root causes of the storage device production failure based in part on an analysis of the process input variables by:

determining, using sum squared errors, that the process input variables are a root cause of the storage device production failure; and identifying the process input variables which are potential root causes of the storage device production failure based in part on the sum squared errors.

29. The non-transitory machine readable medium of claim 28 wherein the computer system is further directed to perform operations comprising:

generating a report indicating the process input variables which correspond to a root cause of the storage device production failure.

30. The non-transitory machine readable medium of claim 28 wherein the identifying one or more potential root causes of the storage device production failure based in pan on an analysis of the process input variables further comprises:

determining probabilities that the process input variables are a root cause of the storage device production failure; and identifying, the process input variables which are potential root causes of the storage device production failure based in part on the determined probabilities.

* * * * *